United States Patent [19]

Austin

[11] Patent Number: 4,642,932
[45] Date of Patent: Feb. 17, 1987

[54] UNDERWATER ICEWALKER

[76] Inventor: Michael Austin, P.O. Box 58, Elmhurst, Pa. 18416

[21] Appl. No.: 788,480

[22] Filed: Oct. 17, 1985

[51] Int. Cl.<sup>4</sup> .............................................. A01K 91/00
[52] U.S. Cl. ........................................... 43/27.2; 43/4
[58] Field of Search ................... 43/27.2, 4, 4.5, 44.99, 43/26.1

[56] References Cited

U.S. PATENT DOCUMENTS

| 2,845,742 | 8/1958 | Skillman | 43/26.1 |
| 2,904,919 | 9/1959 | Long | 43/4 |
| 3,001,313 | 9/1961 | Long | 43/4 |
| 3,974,591 | 8/1976 | Ray | 43/44.99 |

FOREIGN PATENT DOCUMENTS 2153641 8/1985 United Kingdom ............... 43/44.99

Primary Examiner—Gene P. Crosby
Attorney, Agent, or Firm—John Kurucz

[57] ABSTRACT

A moveable underwater icewalker is disclosed. The icewalker comprises, a flotation base, a moveable rod connected to the underside of the base, a flotation arm attached to the rod and culminating in spikes at one end, a plurality of skates and a line attached to the bottom of the rod at one end and whose other end passes through an eyelet which is attached to the underside of the flotation base. By pulling on the line, the icewalker moves forward underneath a mass of ice. The icewalker may cover any distance in any direction that the user desires.

16 Claims, 8 Drawing Figures

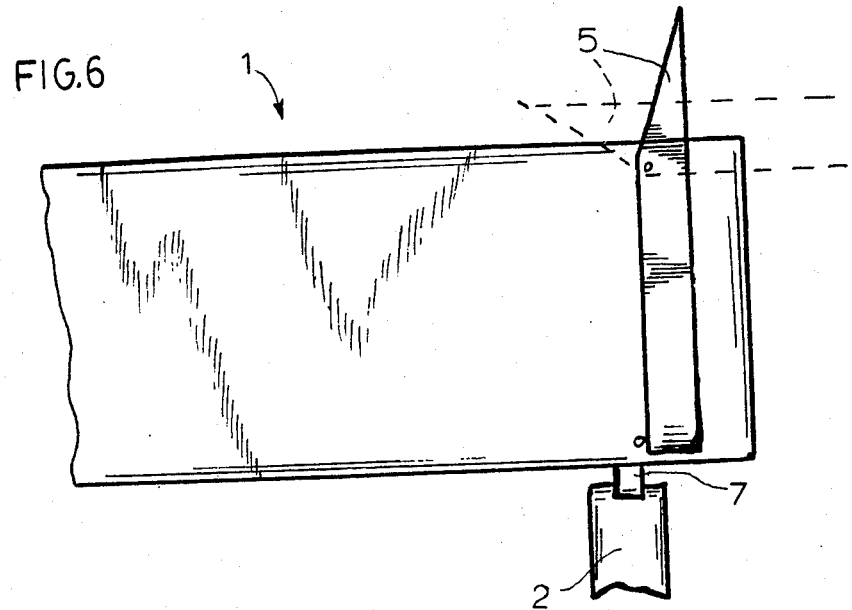
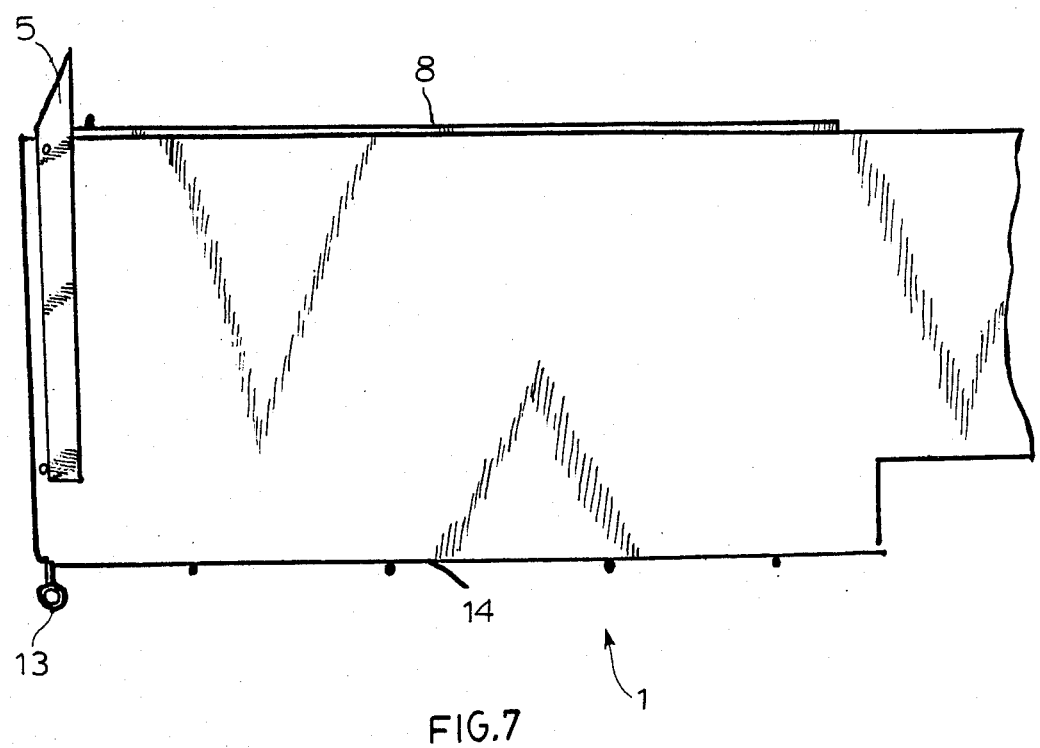

UNDERWATER ICEWALKER

BACKGROUND OF THE INVENTION

1. Field of the Invention

This invention relates to a device which is propelled on the underside of an ice mass formed on a body of water.

2. Brief Description of the Prior Art

Often, it is desirable to gain access to water laying underneath expansive ice blocks. For example, in the winter months when the ice is thick enough to walk on, many of man's leisure hours are spent ice fishing. Traditionally, the methods used in ice fishing are by the use of "tip-ups" or "jigging". Both of these methods require the drilling of a hole in the ice and suspending the bait dropped down the ice hole. In the first method the bait is suspended by a line from a "tip-up". In the second method, "jigging", a bait is attached to a line and moved up and down by the fisherman. In both cases the area being fished is limited to the water directly beneath the ice hole.

Frequently during ice fishing and other activities, such as ice skating, the ice begins to melt and the sportsman falls into the water. Because of the freezing conditions, death can occur very quickly. Thus, it is important that life saving means be immediately available. Unfortunately, usually the only help which is available is a fellow sportsman.

Presently there is a great deal of interest in environmental and ecological studies. For a thorough understanding of the various factors involved, such studies are carried out under different climatic conditions. While such studies are difficult to carry out under the best of conditions, the difficulties become insurmountable when it is desired to examine the environment below a mass of ice.

Thus there is a present need for an apparatus which may be used to extend various activities to areas lying under ice which heretofore were accessible only by submarines or divers.

OBJECTIVES AND SUMMARY OF THE INVENTION

It is an object of the present invention to enable the ice fisherman to greatly increase the fishing area over that ordinarily available using traditional methods of ice fishing.

Accordingly, this is accomplished by utilizing the underwater icewalker, which comprises a flotation platform constructed of lightweight water-resistant material; a moveable rod connected to the flotation base; a moveable flotation arm connected to the rod at one end and culminating in a plurality of spikes at the other end; a plurality of skates connected to the flotation base and a line attached to the rod and to the flotation base. After drilling an access hole in the ice the icewalker is positioned beneath the ice. By pulling on the line, the rod moves back, causing the spikes embedded in the floating arm to become pushed against the ice and at the same time causing the plurality of skates to act as runners, thereby moving the icewalker forward. Releasing the line allows the icewalker to assume a stationary position. The task of pulling on the line, may be performed as many times as the fisherman desires in order to reach a particular destination under the ice.

In a preferred embodiment, a holding box is a portion of the rear of the icewalker and is used to hold any item the user desires to transport, for example, "chum". As the icewalker moves forward, "chum" is released, thereby attracting fish to the path upon which bait is introduced by the use of two fishing lines attached to each other and pulled back and forth beneath the ice.

Thus, the area covered in this way by two fishermen is of an immeasurably greater magnitude than that available by drilling a hole in the ice, the only method of ice fishing which has been heretofore possible.

Another object of this invention is to provide the means for transporting a life saving device to someone who has fallen through thin ice. The icewalker being moveable under ice, can be used to convey such equipment by means of the line which is attached to it. The icewalker, because of its ability to float, can itself also serve as a life saving device.

A further object is to provide the necessary means for studying ecological and environmental factors which exist below the ice. The icewalker may be equipped with a camera for taking pictures, or a drag line for collecting sediment or water samples.

A still further object is to provide a device which is compact, simple to operate and inexpensive to manufacture.

These and other objects and advantages will become apparent from the following description of the invention.

BRIEF DESCRIPTION OF THE DRAWINGS

FIG. 6 is a schematic representation of the action of the moveable skate.

FIG. 7 shows a view of the holding box.

DETAILED DESCRIPTION OF THE PREFERRED EMBODIMENT

Attached to the flotation platform is a rod, such as a metal rod, which is connected to a moveable arm. The arm has spikes on one end. To the base of the metal rod is attached a line which, when pulled, will move the flotation platform forward by passing around the moveable arm and spikes. When the line is released, the flotation platform will stop and the mechanism's metal rod, moveable arm and skates will reposition themselves. The operation of pulling the line which provides the power to move the flotation platform, can be repeated any number of times until the flotation platform has reached the desired location at which time, it is retrieved by drilling a hole in the ice and pulling it out; or if its destination is in open water, it is retrieved directly. The method of placing, moving and retrieving of the icewalker is illustrated diagrammatically in FIG. 1.

Figure 2:
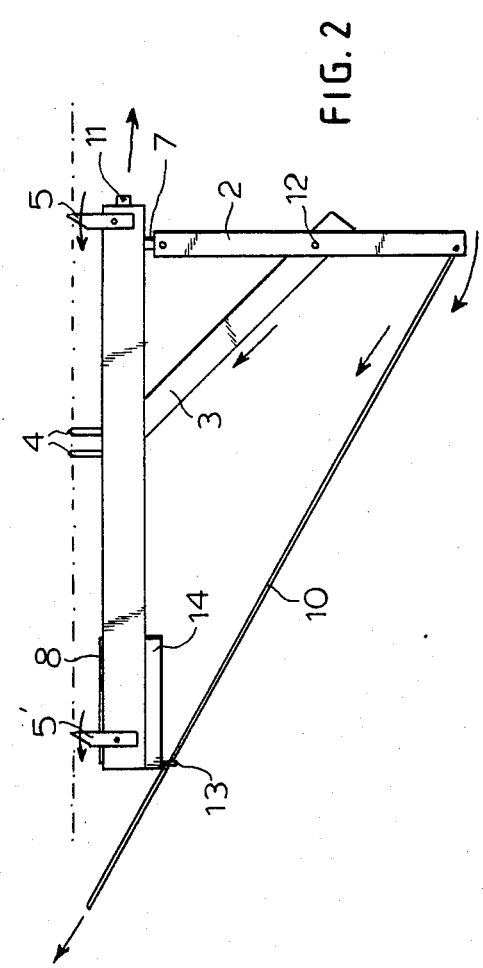
FIG. 2 is a side view of the underwater icewalker.
Figure 3:
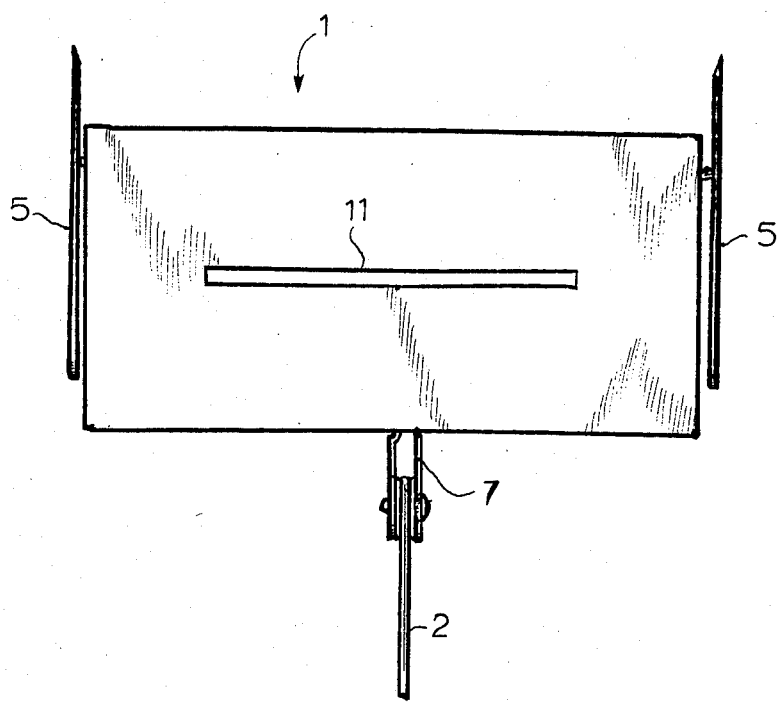
FIG. 3 is a front view of the underwater icewalker.
Figure 4:
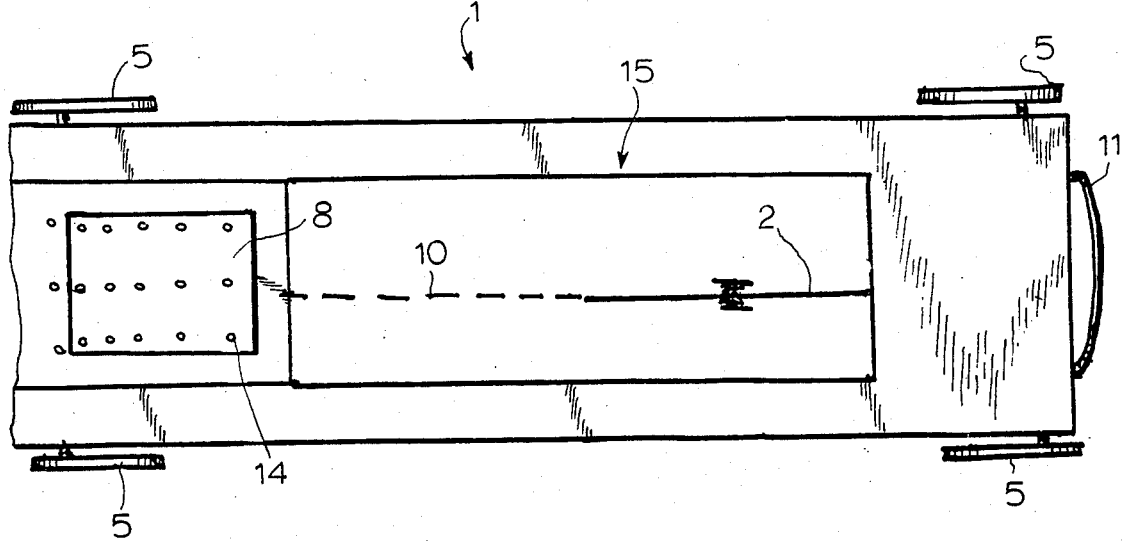
FIG. 4 is a top view of the underwater icewalker.

Referring to FIGS. 2, 3 and 4, the rectangular flotation base 1 of the underwater icewalker, has two front rotatable skates 5,5 and two rear rotatable skates 5',5'. Two 90° brackets 7,7 support a moveable metal rod. A moveable flotation arm 3 is connected by a screw and nut 12 to the movable metal rod 2. Embedded in the moveable flotation arm 3 are two spikes 4. Attached to the bottom of the moveable metal rod 2 is a line 10. Line 10 passes through an eyelet 13 which is attached to the under side of the rear end of the flotation base 1. Attached to the front of the flotation base 1 is a curved handle 11, connected by two screws. A holding box 14 is part of the rear top and bottom of the icewalker 1 with a lid 8. Referring to FIG. 4 the center of the rectangular flotation base 1 is cut out at 15 so as to allow the spikes 4 attached to the flotation arm 3 to stick against the under side of the ice.

The cut-out 15 also acts as a groove that prevents a lateral displacement of the moving arm.

In a preferred embodiment the flotation base is made of wood, the dimensions of the flotation base are 3½" in width, 35" in length and 1½"in thickness. The dimension of the cut-out 15 are 2" by 17".

Figure 1:
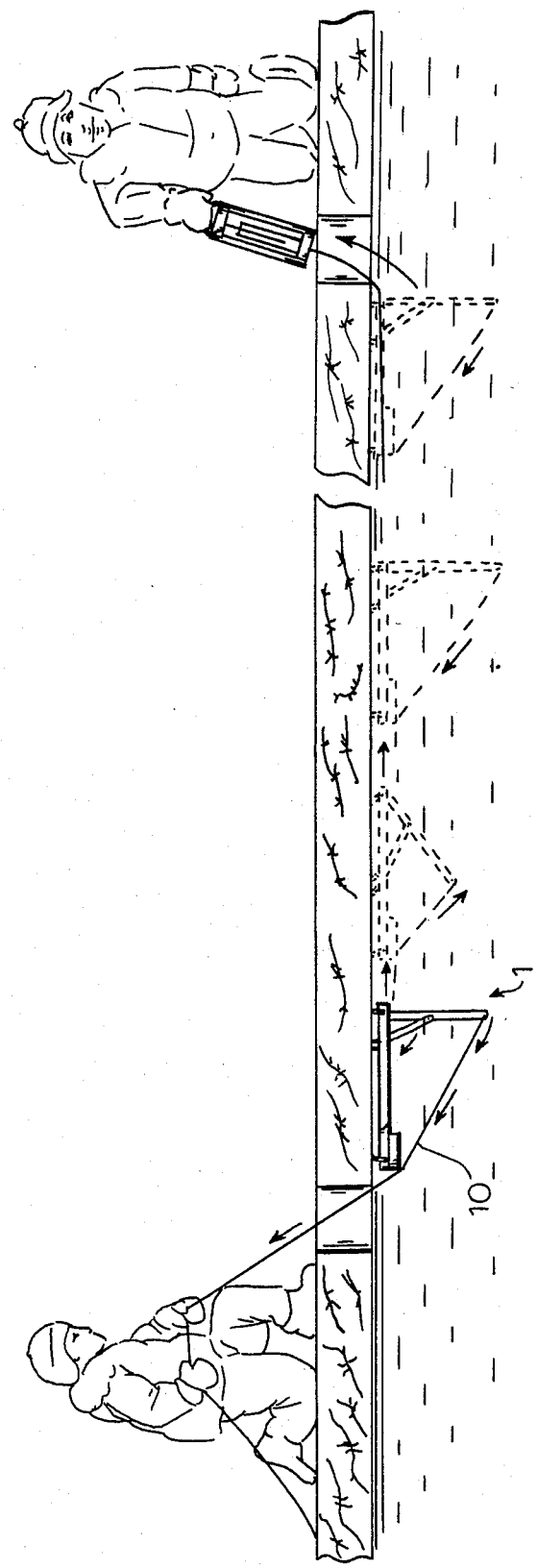
FIG. 1 is a schematic representation of the method of placing, moving and retrieving of the icewalker.
Figure 5:
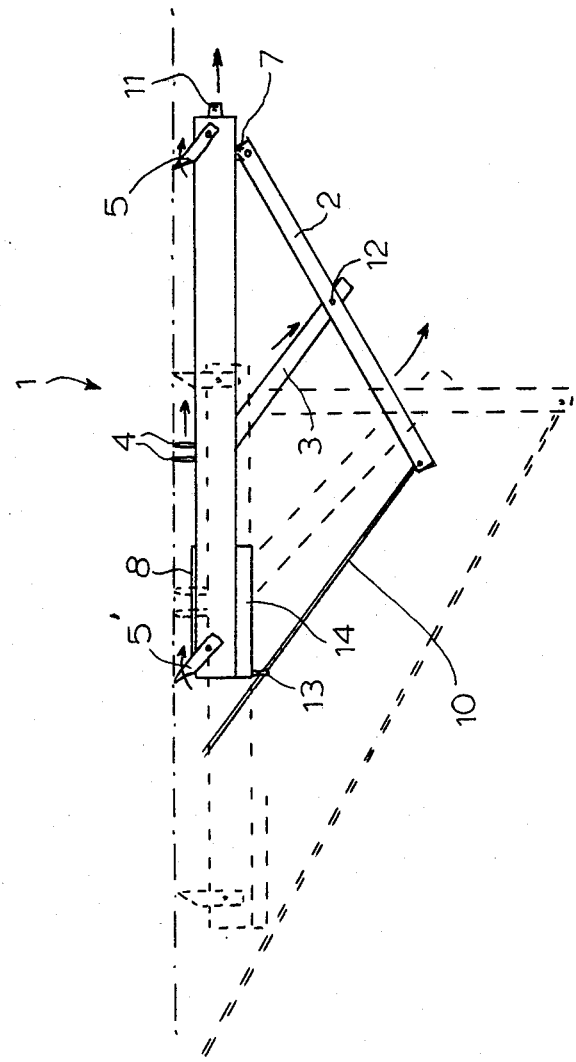
FIG. 5 is a side view of the icewalker showing walker at the start and at the end of a single pulling stroke.

FIGS. 1 and 5 illustrate the use of the icewalker. In FIG. 5, dashed lines show the icewalker at the start of the pulling stroke. Solid lines represent the walker at the end of the pulling stroke.

After drilling a hole in the ice at the starting location, the icewalker is immersed in the water through the ice hole, facing in the direction in which it is to be propelled.

Referring to FIG. 5 with the icewalker in a stationary position pressing up against the underside of the ice, the metal rod 2 drops to a vertical position. The floating arm 3 attached to the metal rod 2 floats up until the spikes 4 imbedded in the floating arm 3 touch the ice. The icewalker is now ready to be propelled.

By pulling gently on the line 10, the metal rod 2 moves back toward the underside of the flotation base. In so doing, it places pressure on the floating arm 3 pushing the spikes 4 imbedded in in the floating arm 3 against the ice. By performing this task the icewalker advances by sliding forward around the moveable arm and spikes. By letting the line 10 loose, the metal rod 2 drops down to the vertical position thereby pulling the flotation arm 3 down, and releasing the spikes 4 from the ice. When the metal rod 2 reaches the vertical position, the flotation arm 3 will float upward and the spikes 4 will imbed in the ice at the new advanced position. The task of pulling on the line 10 can be performed as many times as the user desires in order to reach a destination under the ice.

FIG. 6 illustrates schematically the action of the skates 5,5 and 5'5'. The four moveable skates each have a pointed tip. When the icewalker is stationary, the pointed ends of the moveable skates press against the ice as shown in FIG. 6, top panel. As the icewalker starts to move forward, the skate drops back to a position parallel to the flotation base so that the moveable skate side acts as an ice runner, shown in FIG. 6, lower panel. When the icewalker stops again, the moveable skate will move back to its original position with the pointed end of the skates touching the ice. With the skate in a stationary position they will prevent the icewalker from moving backwards because the tips of the skates dig into the ice thereby preventing backward motion. Thus, the four moveable skates also act as a brake for the icewalker.

In FIG. 7, is shown the holding box 14 with lid 8 which is a portion of the rear of the icewalker and is used to hold any item the user wishes to transport, for example, "chum" of the icewalker is used for fishing. As the icewalker moves forward, the flow of water through the holes in the front box will release the "chum" through the holes in the bottom of the box.

Figure 8:
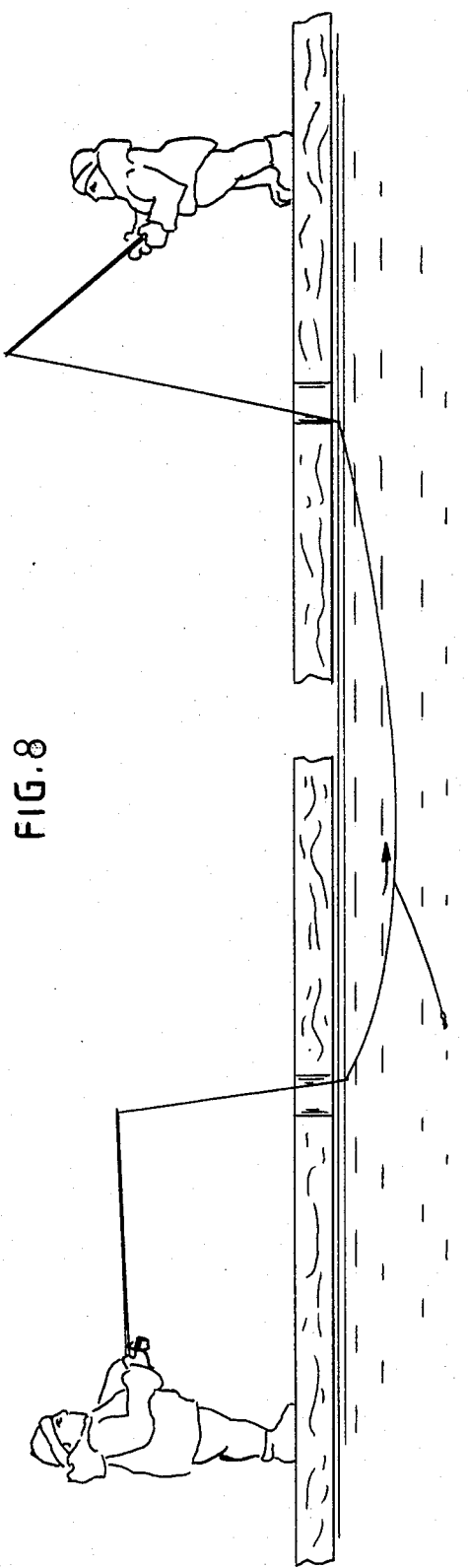
FIG. 8 illustrates a mode of fishing that can be established with the icewalker.

"Chum", as long as it lasts, will be released each time the icewalker is moved forward. This will attract fish to the path upon which bait is introduced by the use of two fishing lines attached to each other and pulled back and forth beneath the ice as shown in FIG. 8. The use of the icewalker allows for attachment of two fishing lines together so that they are beneath a safe solid mass of ice. From the connected fishing lines a bait may be attached and run back and forth below the ice mass for a distance equal to that traveled by the icewalker.

To connect two fishing lines together beneath the ice, the user will detach the line attached to the icewalker and reattach it to one fishing line. The line is then pulled back under the ice to the first ice hole. The line must be detached from the first fishing line and then a second fishing line attached to the first fishing line. The distance under the ice between two ice holes may now be fished by attaching a bait to the connected fishing lines and dropping it down the ice hole. By reeling the line back and forth between two fishermen at the depth the user desires, an area many times larger can be covered thereby enhancing the fisherman's opportunity to catch more fish.

The underwater icewalker may also be used as a means for attaching two fishing lines together beneath a thin ice mass, or thin ice open water, and then retrieved. Two fishing lines may then be connected and bait attached. The line may then be run back and forth below the ice mass for a distance equal to the distance the icewalker has traveled.

The underwater icewalker can be used as a means to transport a life saving device to someone who has fallen through thin ice. By propelling the icewalker, the line attached to the icewalker can be used to convey a life saving device to the person in need.

Because of its flotation property, the icewalker itself, could serve as a life saving device. It can easily be constructed to a scale large enough to hold a person afloat or to carry life saving equipment. Likewise, the icewalker may be provided with, for example, a camera for taking photographs of marine life under the ice. Other equipment, such as a drag line may be attached for collecting bottom or water samples, etc. for ecological or other studies.

It should be noted that additional means may be added to the sled to pivot the rod as as required, whereby the line becomes unnecessary.

Thus the present invention allows the effective attainment of many pursuits and activities that were either impossible or very much limited using prior art methods.

The present invention has been described in specific terms, it is to be understood that the invention is not limited to the specific embodiments disclosed herein and that the invention is therefore claimed in any of its forms, modifications or equivalents within the legitimate and valid scope of the claims.

What is claimed is:

1. A self-propelled device for movement across a bottom surface of a block of ice disposed over water comprising:
   a floating base; and
   propelling means attached to the base for selectively propelling said base in a preselected direction, the propelling means comprising a first member pivotally attached to said base and a second member secured to said first member for moving said base in said direction when said first member rotates upwardly with respect to said base, said first member having a first position extending downwardly from the base and a second upper position at an angle with respect to the first position, the second member being constructed and arranged to push against said bottom surface of the ice to propel said base as said first member rotates from the first position to the second position, the first member being heavier than water and the second member being lighter than water, whereby the first member returns from the second position to said first position due to gravity.

2. The device of claim 1 wherein said first member comprises a rod having an end connected to said base rotatably along a horizontal axis, said rod having a first position in which said rod is substantially vertical extending downwardly from said base and a second position at a vertical angle with respect to said first position.

3. The device of claim 1 further comprising sliding means attached to said base to enable said base to slide across said bottom surface.

4. The device of claim 3 wherein said sliding means comprises vertical blades.

5. The icewalker of claim 1 wherein the flotation base is made of wood.

6. The icewalker of claim 1 wherein the flotation base has a cut-out, said arm extending through said cut-out.

7. A self-propelled device for movement across a bottom surface of a block of ice disposed over water comprising:
a floating base; and
propelling means attached to the base for selectively propelling said base in a preselected direction, a first member pivotably attached to said base and a second member secured to said first member for moving said base in said direction when said first member rotates with respect to said base, said first member comprising a rod having an end connected to said base rotatably along a horizontal axis, said rod having a first position in which said rod is substantially vertical extending downwardly from said base and a second position at a vertical angle with respect to said first position, said second member comprising an arm having a first end connected to said rod and a second end, said arm being constructed and arranged to push against said bottom surface when said device is positioned under said ice block to propel said base as said rod rotates from said first and second position.

8. The device of claim 7 wherein said second end is equipped with at least one spike.

9. The device of claim 8 wherein said rod is heavier than water and said arm is lighter than water, whereby said rod returns from said second position to said first position due to gravity.

10. A self-propelled device for movement across a bottom surface of a block of ice disposed over water comprising:
a floating base;
propelling means attached to the base for selectively propellng said base in a preselected direction; and
sliding means being attached to said base to enable said base to slide across said bottom surface, said sliding means comprising vertical blades, said blades being rotatable between a blade first position in which they slide across said surface along an edge, and a blade second position in which the blades engage the bottom surface.

11. The device of claim 10 wherein said blades are disposed in said blade first position as said propelling means urge said base in said direction, and in said blade second position otherwise.

12. A moveable underwater icewalker which comprises:
a flotation base;
a movable rod connected by hinging means at the top to the front end of the underside of the flotation base;
a moveable flotation arm connected at the bottom to the moveable rod, and whose upper end culminates in a plurality of spikes;
a plurality of moveable skates, each of which has a pointed and a blunt end and each of which is connected to one end of the flotation base; and
a line attached to the bottom of the moveable rod at one end and whose other end passes through an eyelet which is attached to the underside of the rear end of the flotation base for rotating said arm and rod thereby moving the base.

13. The icewalker of claim 12 wherein the moveable rod is made of metal.

14. The icewalker of claim 12 wherein the moveable rod is mounted to the flotation base between two brackets.

15. The icewalker of claim 12 wherein the flotation base has a handle attached thereto.

16. The icewalker of claim 12 wherein the flotation base contains a holding box adapted to selectively release chum as the base moves across the bottom surface of the ice.

* * * * *